US010872523B2

(12) United States Patent
Maeda et al.

(10) Patent No.: US 10,872,523 B2
(45) Date of Patent: Dec. 22, 2020

(54) WIRELESS COMMUNICATION APPARATUS AND WIRELESS COMMUNICATION METHOD

(71) Applicant: Mitsubishi Electric Corporation, Tokyo (JP)

(72) Inventors: Takashi Maeda, Tokyo (JP); Takayoshi Takehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 200 days.

(21) Appl. No.: 15/478,518

(22) Filed: Apr. 4, 2017

(65) Prior Publication Data

US 2018/0132100 A1   May 10, 2018

(30) Foreign Application Priority Data

Nov. 7, 2016   (JP) .................................. 2016-216881

(51) Int. Cl.

| | |
|---|---|
| *G06F 11/00* | (2006.01) |
| *G08G 1/01* | (2006.01) |
| *H04L 29/06* | (2006.01) |
| *H04W 12/12* | (2009.01) |
| *G07C 5/08* | (2006.01) |
| *G08G 1/16* | (2006.01) |

(Continued)

(52) U.S. Cl.
CPC .......... *G08G 1/0112* (2013.01); *G07C 5/0808* (2013.01); *G07C 5/0841* (2013.01); *G08G 1/0129* (2013.01); *G08G 1/161* (2013.01); *H04L 63/1466* (2013.01); *H04W 12/1202* (2019.01); *H04W 12/1204* (2019.01); *G08G 1/096791* (2013.01); *H04L 67/12* (2013.01); *H04L 2209/80* (2013.01); *H04L 2209/84* (2013.01)

(58) Field of Classification Search
CPC ............. H04L 2209/80; H04L 2209/84; H04L 63/1466; H04L 67/12
USPC ...................... 340/903, 905; 713/156; 726/22
See application file for complete search history.

(56) References Cited

U.S. PATENT DOCUMENTS

| | | | |
|---|---|---|---|
| 9,697,355 B1* | 7/2017 | Park ....................... G06F 21/552 |
| 2009/0271112 A1* | 10/2009 | Basnayake ............ G01S 5/0072 |
| | | | 701/469 |

(Continued)

FOREIGN PATENT DOCUMENTS

| | | |
|---|---|---|
| JP | 2007-83972 A | 4/2007 |
| JP | 2015-139011 A | 7/2015 |

OTHER PUBLICATIONS

Certificate Revocation in Vehicular Networks, Maxim Raya, Daniel Jungels, Panos Papadimitratos, Imad Aad and JeanPierre Hubaux, Laboratory for computer Communications and Applications (LCA), School of Computer and Communication Sciences, LCAReport, 2006-006 (Year: 2006).*

(Continued)

*Primary Examiner* — Gary S Gracia
(74) *Attorney, Agent, or Firm* — Sughrue Mion, PLLC; Richard C. Turner

(57) ABSTRACT

In automatic driving or the like, it is necessary to prevent an attacker from performing message transmission by impersonating a vehicle. If it is determined that a history of acquired behavioral information of own vehicle does not match vehicle behavior, a message indicating that communication between the own vehicle and a surrounding vehicle is stopped is transmitted to the surrounding vehicle.

12 Claims, 7 Drawing Sheets

(51) Int. Cl.
*G06F 12/14* (2006.01)
*G08G 1/0967* (2006.01)
*H04L 29/08* (2006.01)

(56) References Cited

U.S. PATENT DOCUMENTS

| | | | |
|---|---|---|---|
| 2010/0030397 A1* | 2/2010 | Tachibana | G05D 1/0295 |
| | | | 701/1 |
| 2010/0210254 A1* | 8/2010 | Kelly | H04K 3/415 |
| | | | 455/418 |
| 2010/0317420 A1* | 12/2010 | Hoffberg | G07F 17/323 |
| | | | 463/1 |
| 2011/0080302 A1* | 4/2011 | Muthaiah | H04W 12/0609 |
| | | | 340/903 |
| 2011/0083011 A1* | 4/2011 | DiCrescenzo | H04L 9/0891 |
| | | | 713/158 |
| 2011/0140848 A1* | 6/2011 | Abukawa | H04H 60/44 |
| | | | 340/8.1 |
| 2012/0265995 A1* | 10/2012 | Kherani | H04W 12/06 |
| | | | 713/179 |
| 2013/0131918 A1* | 5/2013 | Hahne | G08G 1/096791 |
| | | | 701/36 |
| 2013/0282843 A1* | 10/2013 | Nagayama | H04L 51/20 |
| | | | 709/206 |
| 2014/0306799 A1* | 10/2014 | Ricci | B60R 25/1004 |
| | | | 340/5.83 |
| 2015/0127189 A1* | 5/2015 | Mehr | B60W 30/165 |
| | | | 701/1 |
| 2015/0156215 A1* | 6/2015 | van den Berg | H04W 12/1202 |
| | | | 726/22 |
| 2016/0007208 A1* | 1/2016 | Yang | H04W 16/14 |
| | | | 455/422.1 |
| 2016/0065367 A1* | 3/2016 | Oshida | H04W 12/0609 |
| | | | 370/329 |
| 2016/0087804 A1* | 3/2016 | Park | H04L 67/12 |
| | | | 713/156 |
| 2016/0140842 A1* | 5/2016 | Park | G08G 1/052 |
| | | | 340/905 |
| 2016/0313447 A1* | 10/2016 | Ishio | G01C 21/26 |
| 2016/0335897 A1* | 11/2016 | Naserian | H04L 63/126 |
| 2017/0046510 A1* | 2/2017 | Chen | G06F 21/552 |

OTHER PUBLICATIONS

Communication dated Sep. 26, 2017 from the Japanese Patent Office in counterpart application No. 2016-216881.

* cited by examiner

WIRELESS COMMUNICATION APPARATUS AND WIRELESS COMMUNICATION METHOD

BACKGROUND OF THE INVENTION

1. Field of the Invention

The present invention relates to wireless communication apparatuses and wireless communication methods, and particularly relates to a vehicle wireless communication apparatus and a vehicle wireless communication method.

2. Description of the Background Art

In the conventional wireless communication apparatuses, a behavioral information acquisition unit acquires behavioral information of own vehicle, and a behavioral information storage unit stores a history of the acquired behavioral information. A determination unit determines whether the stored history of the behavioral information matches the behavior of the own vehicle. If the determination unit determines that it matches the behavior of the own vehicle, a transmission unit performs message transmission (e.g., see Japanese Laid-Open Patent Publication No. 2015-139011). In this manner, message transmission can be performed only when the wireless communication apparatus is mounted in the vehicle. Accordingly, even if an attacker removes the wireless communication apparatus from the vehicle and tries to transmit a message to a surrounding vehicle for attacking purposes with the apparatus placed on the road or the like, the message will not be transmitted, so that it is possible to prevent an attack. That is, it is possible to prevent an attacker from performing message transmission by impersonating the vehicle.

SUMMARY OF THE INVENTION

However, the wireless communication apparatus described in Japanese Laid-Open Patent Publication No. 2015-139011 is not sufficient to prevent an attacker from performing message transmission by impersonating the vehicle.

The present invention has been made to solve the above-described problem, and an object of the invention is to further inhibit impersonation of a vehicle by an attacker in a wireless communication apparatus.

A wireless communication apparatus according to the present invention includes: a processor to execute a program; and a memory to store the program which, when executed by the processor, results in performance of steps comprising, acquiring behavioral information of own vehicle during driving;

storing the behavioral information in the behavioral information storage;

determining whether the behavioral information stored in the behavioral information storage represents vehicle behavior; and performing message transmission on the basis of a result of the determination by a transmitter;

if the result of the determination shows that the behavioral information represents vehicle behavior, message transmission is performed, and if the result of the determination shows that the behavioral information does not represent vehicle behavior, a message indicating that transmission is stopped is transmitted to another vehicle.

According to the present invention, it is possible to provide a wireless communication apparatus capable of further inhibiting impersonation of a vehicle by an attacker.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

In the following, a first embodiment of the present invention will be described with reference to the drawings.

Figure 1:
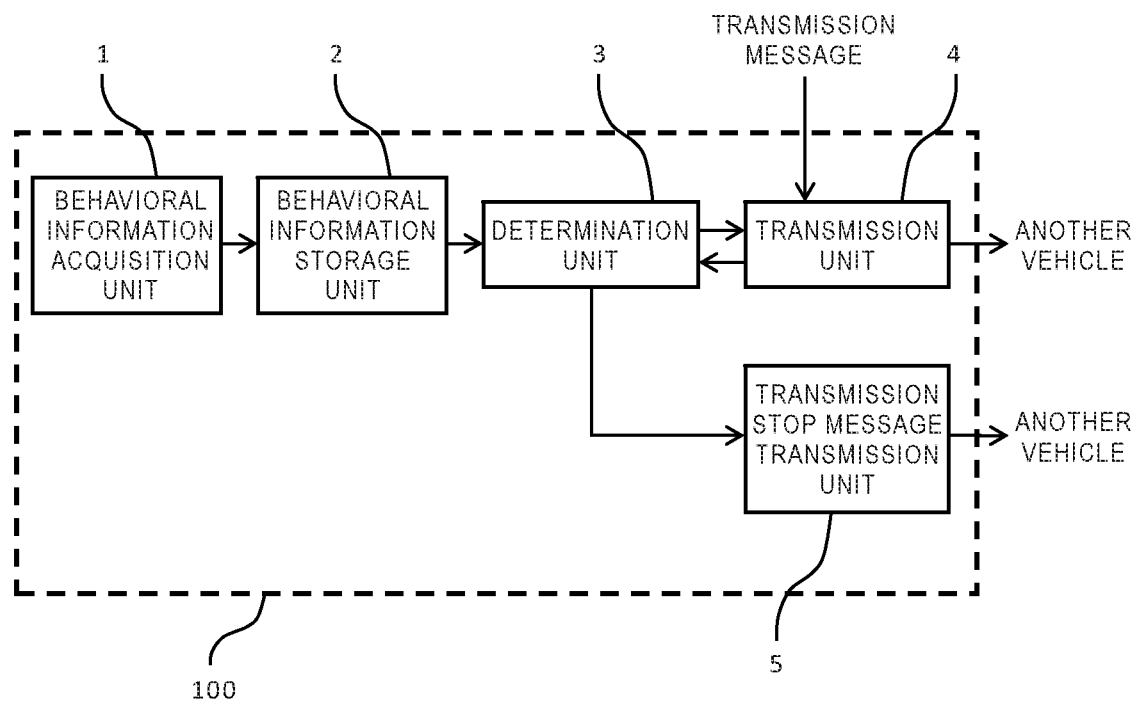
FIG. 1 is a functional block diagram on the transmission side of a wireless communication apparatus according to a first embodiment of the present invention.

FIG. 1 is a functional block diagram on the transmission side of a wireless communication apparatus 100 according to the first embodiment of the present invention. Although the transmission function of the wireless communication apparatus 100 will be described below, a wireless communication apparatus generally includes both a transmission function and a reception function.

Figure 2:
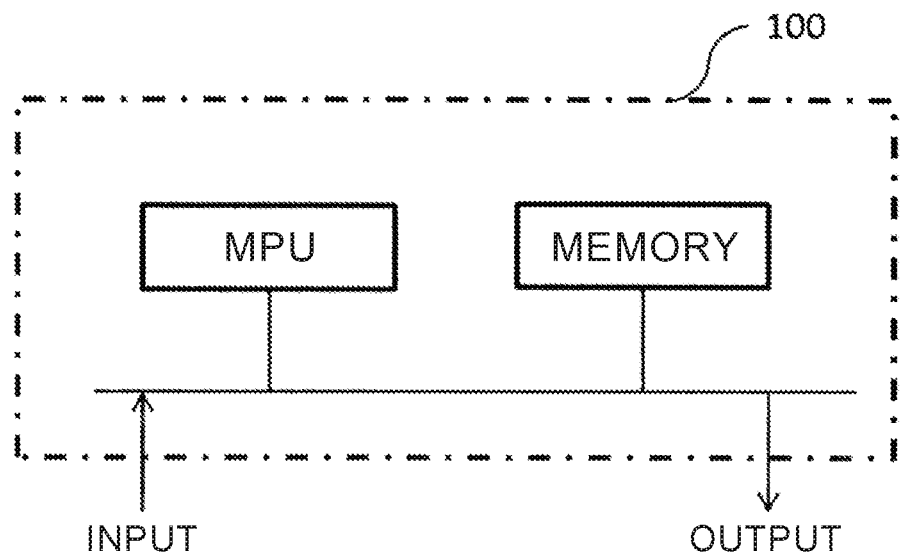
FIG. 2 is a hardware block diagram of the wireless communication apparatus according to the first embodiment of the present invention.

As shown in FIG. 1, the wireless communication apparatus 100 on the transmission side is composed of a behavioral information acquisition unit 1, a behavioral information storage unit 2, a determination unit 3, a transmission unit 4, and a transmission stop message transmission unit 5. These units may be implemented by a combination of a processor (MPU) and a computer program stored in a memory as shown in FIG. 2, may be implemented by dedicated hardware such as an ASIC, may be implemented by a reconfigurable gate array such as an FPGA, or may be implemented by a combination thereof.

The behavioral information acquisition unit 1 acquires behavioral information during driving, and is configured from an acceleration sensor or a GPS device. Typically, the acceleration sensor is a triaxial acceleration sensor, but may be a biaxial or uniaxial acceleration sensor. From acceleration information obtained from the acceleration sensor, the movement of the wireless communication apparatus 100 and hence the movement of a vehicle in which the wireless communication apparatus 100 is mounted can be known. In addition, speed information can be obtained by integrating the acceleration information.

The GPS device acquires location information from a GPS signal. Information on latitudes, longitudes, and altitudes can be known by the GPS device. Besides a GPS device, it is also possible to use a location information acquisition device that acquires location information by using any satellite positioning system such as Galileo, BeiDou, and GLONASS. In addition to satellite positioning, it is possible to employ positioning based on radio waves from a mobile phone base station, a wireless LAN access point, or the like.

In the first embodiment, the behavioral information acquisition unit 1 is configured from a sensor such as an acceleration sensor and a GPS device. However, it is possible to use any sensor other than an acceleration sensor and a GPS device so long as the sensor is capable of acquiring behavioral information of the wireless communication apparatus 100.

The behavioral information storage unit 2 stores behavioral information (sensor information) acquired from the behavioral information acquisition unit 1 and a history thereof, and is configured from any type of memory device. The behavioral information acquisition unit 1 periodically acquires behavioral information, and stores the acquired behavioral information in the behavioral information storage unit 2. In the behavioral information storage unit 2, measurement data from the behavioral information acquisition unit 1 may be directly stored, or data that has been subjected to filtering processing such as noise removal or data that has been subjected to signal analysis processing such as Fourier analysis may be stored.

The determination unit 3 determines whether the behavioral information stored in the behavioral information storage unit 2 matches vehicle behavior. The determination unit 3 is, for example, an identifier obtained by performing machine learning by using, as learning data, behavioral information representing vehicle behavior and information representing behavior other than vehicle behavior which are prepared in advance. As the method for machine learning, it is possible to use any method such as a neural network, a decision tree, or a support vector machine. The learning data may be data obtained on the basis of actual measurement or data generated by simulation. In the first embodiment, the determination unit 3 is intended to classify the behavioral information into vehicle behavior and other behavior. However, the behavior to be identified may be decided according to the requirements under practical operation.

The determination unit 3 may adopt a configuration other than an identifier based on machine learning. For example, the determination unit 3 may be configured to perform rule-based processing for determining whether a predefined rule is satisfied. Alternatively, the determination unit 3 may be configured to perform rule-based determination and determination using an identifier in combination, to obtain a final determination result.

Figure 3:
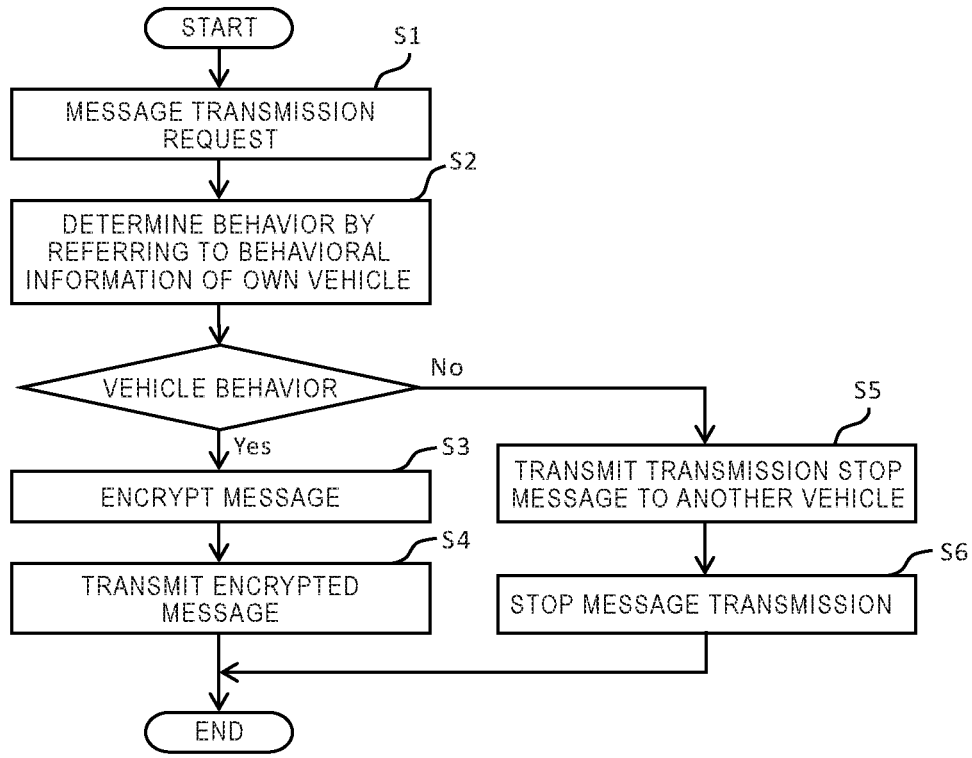
FIG. 3 is a flowchart of message transmission according to the first embodiment of the present invention.

As shown in FIG. 3, the transmission unit 4 accepts a request to perform vehicle-to-vehicle communication and the content of a message to be transmitted (transmission message). Upon reception of a transmission request (Step 1, hereinafter referred to as "S1"), the transmission unit 4 instructs the determination unit 3 to determine whether the behavior of the wireless communication apparatus 100 mounted in own vehicle matches vehicle behavior (S2). If it is determined, as a result of the determination performed by the determination unit 3, that the behavior of the wireless communication apparatus 100 matches vehicle behavior, the transmission unit 4 performs encryption (S3) and transmission (S4) of the transmission message.

If it is determined, as a result of the determination performed by the determination unit 3, that the behavior of the wireless communication apparatus 100 does not match vehicle behavior, the transmission stop message transmission unit 5 transmits, to a vehicle in the surroundings of the own vehicle, a message indicating that communication between the two vehicles is stopped (S5), and stops the transmission of the transmission message from the transmission unit 4 (S6).

Although the transmission stop message transmission unit 5 in the first embodiment has been described as a configuration separate from the transmission unit 4, a single transmission device may be used to perform transmission by switching between the transmission message and the transmission stop message.

In this manner, according to the first embodiment of the present invention, if the behavior of the wireless communication apparatus does not match vehicle behavior, in addition to not transmitting the transmission message, a message indicating that communication is stopped is transmitted to the other party to which transmission is to be performed, and thereby, the other party who has received the message can be made aware of an abnormality on the transmission side. Accordingly, it is possible to prevent accidents and further inhibit impersonation of a vehicle by an attacker.

Second Embodiment

Figure 4:
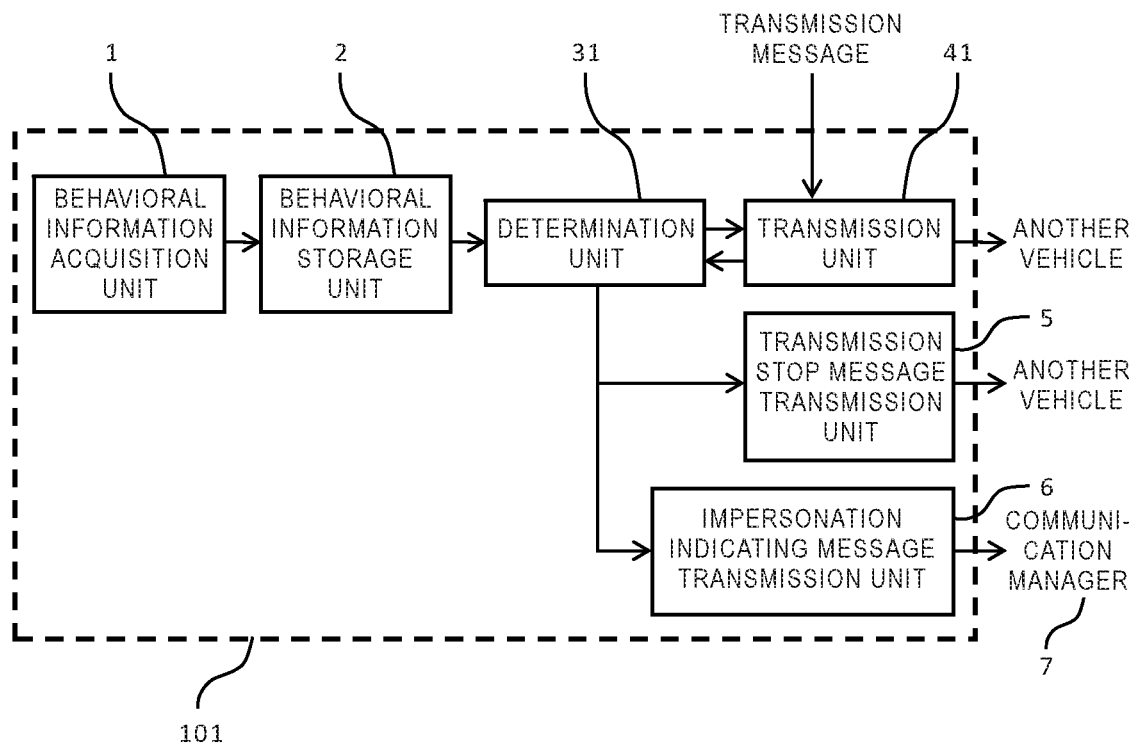
FIG. 4 is a functional block diagram on the transmission side of a wireless communication apparatus according to a second embodiment of the present invention.
Figure 5:
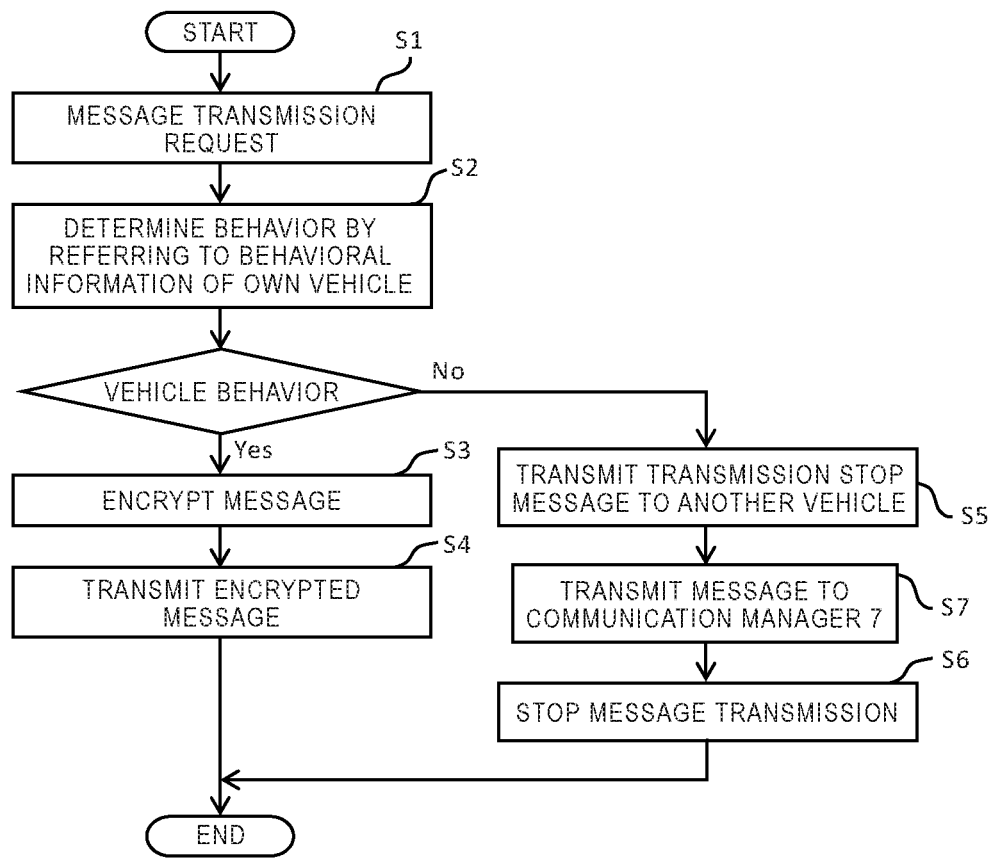
FIG. 5 is a flowchart of message transmission according to the second embodiment of the present invention.

In the following, a second embodiment of the present invention will be described with reference to FIGS. 4 and 5. FIG. 4 is a functional block diagram on the transmission side of a wireless communication apparatus 101 according to the second embodiment of the present invention. FIG. 5 is a flowchart of message transmission according to the second embodiment of the present invention. In the drawings, identical reference numerals denote identical or equivalent parts. Accordingly, the configurations and operations of the behavioral information acquisition unit 1, the behavioral information storage unit 2, and the transmission stop message transmission unit 5 are the same as those in the first embodiment. An impersonation indicating message transmission unit 6 is added to the first embodiment.

As in the first embodiment, the units of the wireless communication apparatus 101 according to the second embodiment may be implemented by a combination of a processor (MPU) and a computer program stored in a memory as shown in FIG. 2, may be implemented by dedicated hardware such as an ASIC, may be implemented by a reconfigurable gate array such as an FPGA, or may be implemented by a combination thereof.

A transmission unit 41 according to the second embodiment accepts a request to perform vehicle-to-vehicle communication and the content of a message to be transmitted (transmission message). Upon reception of a transmission request (S1 in FIG. 5), the transmission unit 41 instructs a determination unit 31 to determine whether the behavior of the wireless communication apparatus 101 mounted in own vehicle matches vehicle behavior (S2). If it is determined, as a result of the determination performed by the determination unit 31, that the behavior of the wireless communication apparatus 101 matches vehicle behavior, the transmission unit 41 performs encryption (S3) and transmission (S4) of the transmission message.

If it is determined, as a result of the determination performed by the determination unit 31, that the behavior of the wireless communication apparatus 101 does not match vehicle behavior, the transmission stop message transmission unit 5 transmits, to a vehicle in the surroundings of the own vehicle, a message indicating that communication between the two vehicles is stopped (S5), the impersonation indicating message transmission unit 6 transmits, to a communication manager 7, a message indicating that the own vehicle is impersonated (S7), and the transmission unit 41 stops the transmission of the transmission message (S6).

In the second embodiment, the transmission unit 41, the transmission stop message transmission unit 5, and the impersonation indicating message transmission unit 6 have been described as separate configurations. However, a single transmission device may be used to transmit the transmission message, the transmission stop message, and the impersonation indicating message by switching among the three transmission contents. Alternatively, the transmission stop message transmission unit 5 and the impersonation indicating message transmission unit 6 may be configured by a single transmission device, to transmit the message to another vehicle or a communication manager by switching the message.

In this manner, according to the second embodiment of the present invention, if the behavior of the wireless communication apparatus does not match vehicle behavior, in addition to not transmitting the transmission message, a message indicating that communication is stopped is transmitted to the other party to which transmission is to be performed, and thereby, the other party who has received the message can be made aware of an abnormality on the transmission side. Further, the impersonation indicating message is transmitted to the communication manager, so that the communication manager can promptly take actions against the attacker. This makes it even more difficult for the attacker to impersonate the vehicle, resulting in an increase in the inhibiting effect.

Third Embodiment

Figure 6:
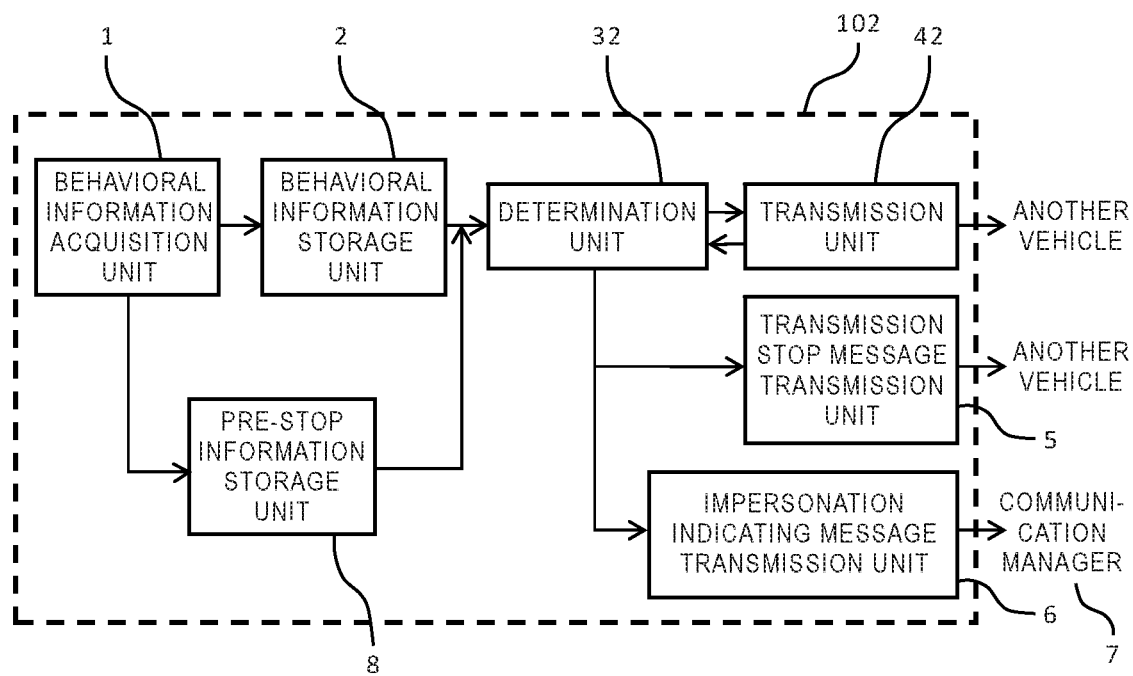
FIG. 6 is a functional block diagram on the transmission side of a wireless communication apparatus according to a third embodiment of the present invention.

In the following, a third embodiment of the present invention will be described with reference to FIG. 6. FIG. 6 is a functional block diagram on the transmission side of a wireless communication apparatus 102 according to the third embodiment of the present invention. In the drawing, identical reference numerals denote identical or equivalent parts. Accordingly, the configurations and operations of the behavioral information acquisition unit 1 and the behavioral information storage unit 2 are the same as those in the first embodiment.

A transmission unit 42 according to the third embodiment accepts a request to perform vehicle-to-vehicle communication and the content of a message to be transmitted (transmission message). Upon reception of a transmission request, the transmission unit 42 instructs a determination unit 32 to determine whether the behavior of the wireless communication apparatus 102 matches vehicle behavior. Even if no data has been stored in advance in the behavioral information storage unit 2, the determination unit 32 can perform the determination on the basis of the information in a pre-stop information storage unit 8. If it is determined, as a result of the determination, that the behavior of the wireless communication apparatus 102 matches vehicle behavior the transmission unit 42 performs encryption and transmission of the transmission message. If the behavior of the wireless communication apparatus 102 does not match vehicle behavior, transmission is stopped by the same procedure as that described in the second embodiment.

Note that the pre-stop information storage unit 8 holds a history of the behavior prior to the previous stop. Further, the pre-stop information storage unit 8 holds, in advance, sample data for vehicle behavior before the start of data collection.

In this manner, according to the third embodiment of the present invention, the vehicle behavior can be determined on the basis of the history information during the previous driving that is accumulated in the pre-stop information storage unit 8 at the time of starting the vehicle or on the basis of the information of sample data.

Fourth Embodiment

Figure 7:
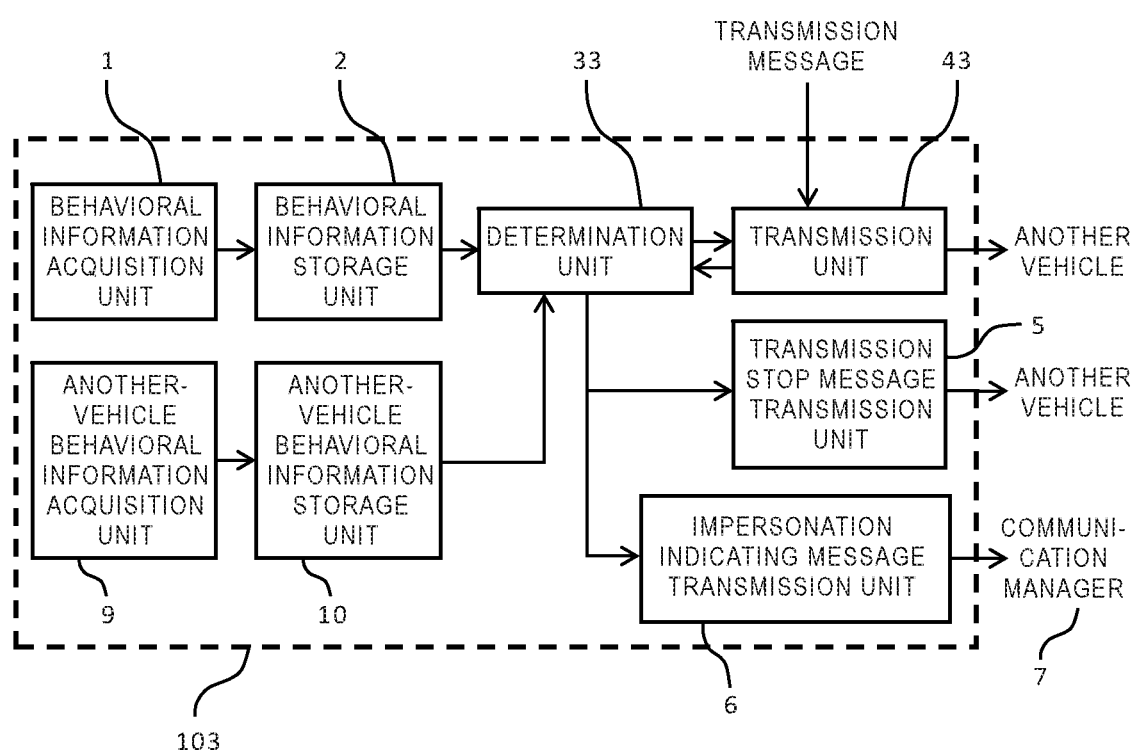
FIG. 7 is a functional block diagram on the transmission side of a wireless communication apparatus according to a fourth embodiment of the present invention.
Figure 8:
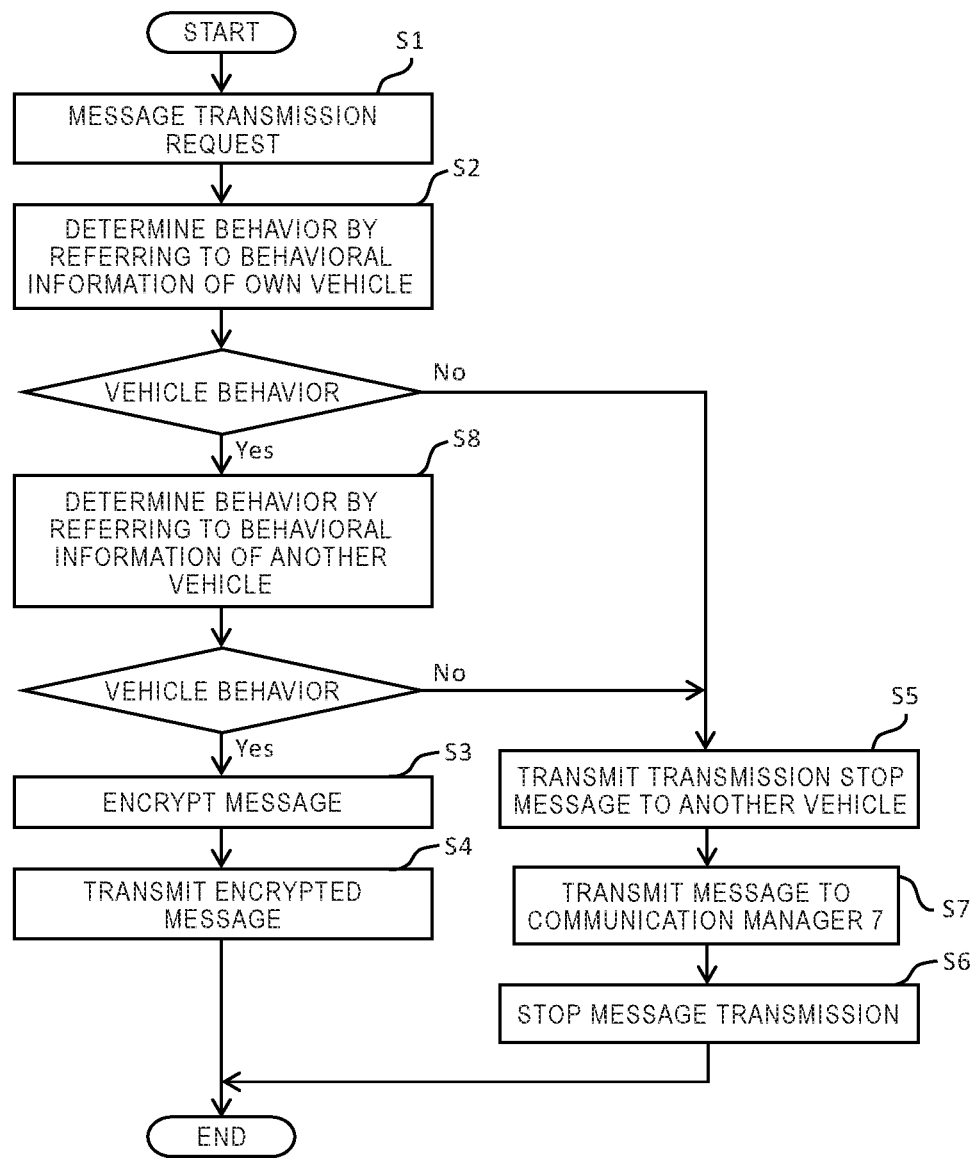
FIG. 8 is a flowchart of message transmission according to the fourth embodiment of the present invention.

In the following, a fourth embodiment of the present invention will be described with reference to FIGS. 7 and 8. FIG. 7 is a functional block diagram on the transmission side of a wireless communication apparatus 103 according to the fourth embodiment of the present invention. FIG. 8 is a flowchart of message transmission according to the fourth embodiment of the present invention. In the drawings, identical reference numerals denote identical or equivalent parts. Accordingly, the configurations and operations of the behavioral information acquisition unit 1, the behavioral information storage unit 2, the transmission stop message transmission unit 5, and the impersonation indicating message transmission unit 6 are the same as those in the second embodiment.

As in the first or second embodiment, the units of the wireless communication apparatus 103 according to the fourth embodiment may be implemented by a combination of a processor (MPU) and a computer program stored in a memory as shown in FIG. 2, may be implemented by dedicated hardware such as an ASIC, may be implemented by a reconfigurable gate array such as an FPGA, or may be implemented by a combination thereof.

A transmission unit 43 accepts a request to perform vehicle-to-vehicle communication and the content of a message to be transmitted (transmission message). Upon reception of a transmission request (S1 in FIG. 8), the transmission unit 43 instructs a determination unit 33 to determine whether the behavior of the wireless communication apparatus 103 mounted in own vehicle matches vehicle behavior (S2). If it is determined, as a result of the determination performed by the determination unit 33, that the behavior of the wireless communication apparatus 103 does not match vehicle behavior, the transmission stop message transmission unit 5 transmits, to a vehicle in the surroundings of the own vehicle, a message indicating that communication between the two vehicles is stopped (S5). Further, the impersonation indicating message transmission unit 6 transmits, to the communication manager 7, a message indicating that the own vehicle is impersonated (S7). Then, the transmission of the transmission message is stopped (S6). If it is determined, as a result of the determination performed by the determination unit 33, that the behavioral information of the own vehicle matches vehicle behavior, behavioral information of another vehicle is determined.

In order to determine the behavioral information of another vehicle, the wireless communication apparatus 103 includes an another-vehicle behavioral information acquisition unit 9 and an another-vehicle behavioral information storage unit 10, as shown in FIG. 7. The another-vehicle behavioral information acquisition unit 9 acquires, from a message received from another vehicle by vehicle-to-vehicle communication, behavioral information of the other vehicle, which is the transmission source of the message.

The another-vehicle behavioral information storage unit 10 stores a history of the behavioral information of the other vehicle that has been acquired by the another-vehicle behavioral information acquisition unit 9. If it is determined that the behavioral information of the own vehicle matches vehicle behavior, the transmission unit 43 instructs the determination unit 33 to determine whether the behavior of the wireless communication apparatus of the other vehicle matches vehicle behavior (S8). If it is determined, as a result of the determination performed by the determination unit 33, that the behavioral information of the other vehicle also matches vehicle behavior, the transmission unit 43 performs encryption (S3) and transmission (S4) of the transmission message.

If it is determined, as a result of the determination performed by the determination unit 33, that the behavioral information of the other vehicle does not match vehicle behavior, the transmission stop message transmission unit 5 transmits, to a vehicle in the surroundings of the own vehicle, a message indicating that communication between the two vehicles is stopped (S5). Further, the impersonation indicating message transmission unit 6 transmits, to the communication manager 7, a message indicating that the own vehicle is impersonated (S7), and the transmission unit 43 stops the transmission of the transmission message (S6).

In the fourth embodiment, the transmission unit 43, the transmission stop message transmission unit 5, and the impersonation indicating message transmission unit 6 have been described as separate configurations. However, a single transmission device may be used to transmit the transmission message, the transmission stop message, and the impersonation indicating message by switching among the three transmission contents. Alternatively, the transmission stop message transmission unit 5 and the impersonation indicating message transmission unit 6 may be configured by a single transmission device, to transmit the message to another vehicle or the communication manager 7 by switching the message.

Further, if there is no need to transmit a message to the communication manager 7, the impersonation indicating message transmission unit 6 may be omitted, or the transmission of the transmission message may be simply stopped without transmitting the message indicating that communication between the vehicles is stopped.

In this manner, according to the fourth embodiment of the present invention, the vehicle behavior determination is performed also on the basis of the another-vehicle behavioral information, in addition to the vehicle behavior determination on the basis of the behavioral information of the own vehicle. Accordingly, the information necessary for the attacker to conduct impersonation is increased, so that it becomes difficult for the attacker to impersonate the vehicle, resulting in an increase in the inhibiting effect.

Fifth Embodiment

Figure 9:
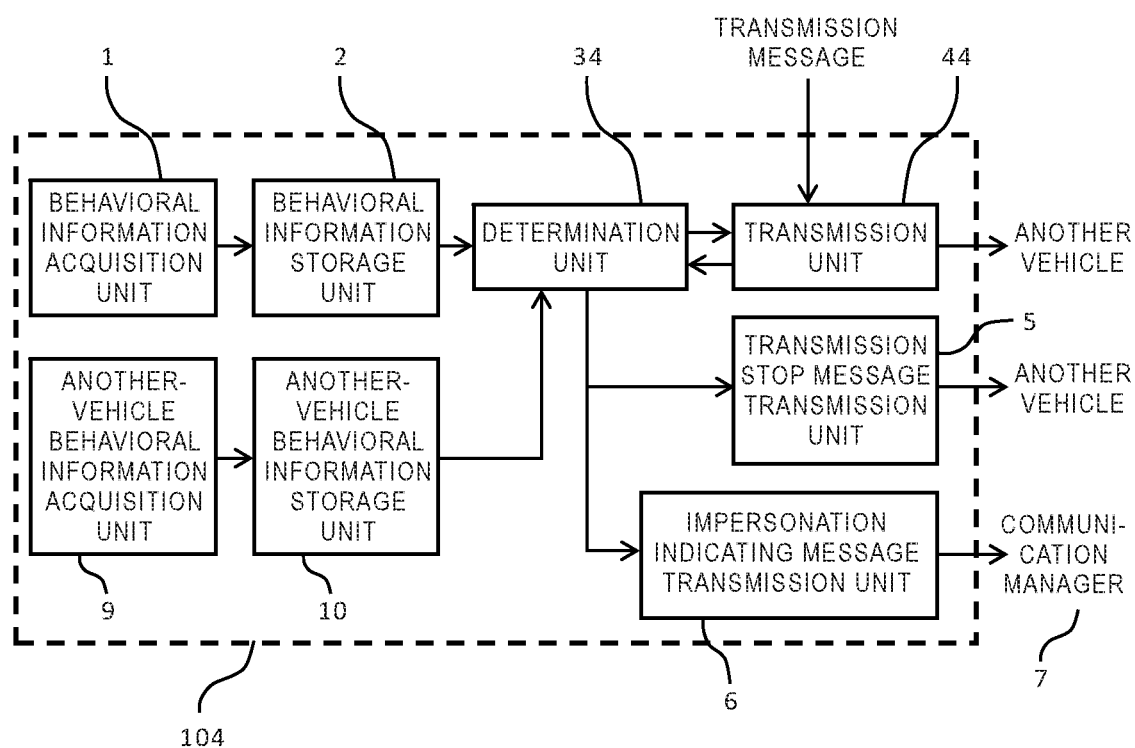
FIG. 9 is a functional block diagram on the transmission side of a wireless communication apparatus according to a fifth embodiment of the present invention.
Figure 10:
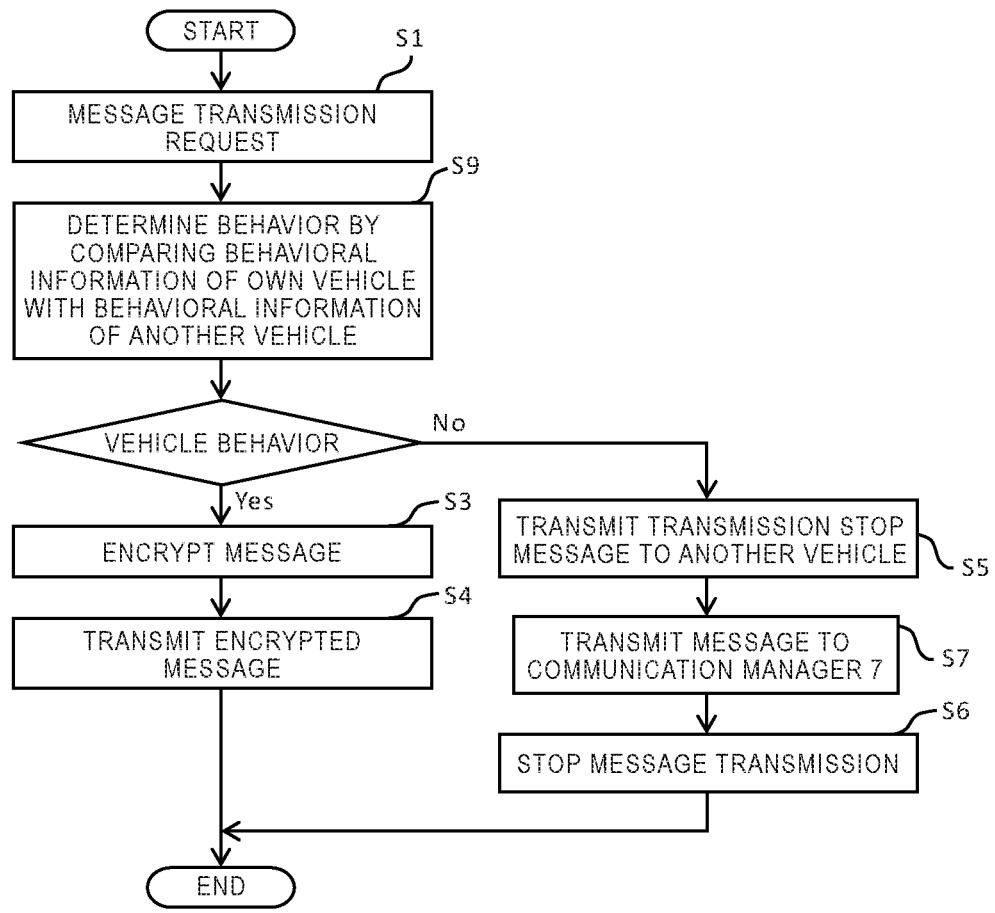
FIG. 10 is a flowchart of message transmission according to the fifth embodiment of the present invention.

In the following, a fifth embodiment of the present invention will be described with reference to FIGS. 9 and 10. FIG. 9 is a functional block diagram on the transmission side of a wireless communication apparatus 104 according to the fifth embodiment of the present invention. FIG. 10 is a flowchart of message transmission according to the fifth embodiment of the present invention. In the drawings, identical reference numerals denote identical or equivalent parts. Accordingly, the configurations and operations of the behavioral information acquisition unit 1, the behavioral information storage unit 2, the transmission stop message transmission unit 5, the impersonation indicating message transmission unit 6, the another-vehicle behavioral information acquisition unit 9, and the another-vehicle behavioral information storage unit 10 are the same as those in the fourth embodiment.

As in the first, second, or fourth embodiment, the units of the wireless communication apparatus 104 according to the fifth embodiment may be implemented by a combination of a processor (MPU) and a computer program stored in a memory as shown in FIG. 2, may be implemented by dedicated hardware such as an ASIC, may be implemented by a reconfigurable gate array such as an FPGA, or may be implemented by a combination thereof.

A transmission unit 44 according to the fifth embodiment accepts a request to perform vehicle-to-vehicle communication and the content of a message to be transmitted (transmission message). Upon reception of a transmission request (S1 in FIG. 10), the transmission unit 44 instructs a determination unit 34 to determine whether the history of the behavioral information of own vehicle matches vehicle behavior by comparing the behavior of the wireless communication apparatus of another vehicle and the behavior of the own vehicle (S9). If it is determined, as a result of the determination performed by the determination unit 34, that the history of the behavioral information matches vehicle behavior, the transmission unit 44 performs encryption (S3) and transmission (S4) of the transmission message.

If it is determined, as a result of the determination performed by the determination unit 34, that the history of the behavioral information does not match vehicle behavior, the transmission stop message transmission unit 5 transmits, to a vehicle in the surroundings of the own vehicle, a message indicating that communication between the two vehicles is stopped (S5). Further, the impersonation indicating message transmission unit 6 transmits, to the communication manager 7, a message indicating that the own vehicle is impersonated (S7), and the transmission unit 44 stops the transmission of the transmission message (S6).

In the fifth embodiment, the transmission unit 44, the transmission stop message transmission unit 5, and the impersonation indicating message transmission unit 6 have been described as separate configurations. However, a single transmission device may be used to transmit the transmission message, the transmission stop message, and the impersonation indicating message by switching among the three message contents. Alternatively, the transmission stop message transmission unit 5 and the impersonation indicating message transmission unit 6 may be configured by a single transmission device, to transmit the message to another vehicle or the communication manager 7 by switching the message. Further, if there is no need to transmit a message to the communication manager 7, the impersonation indicating message transmission unit 6 may be omitted, or the transmission of the transmission message may be simply stopped without transmitting the message indicating that vehicle-to-vehicle communication is stopped.

In this manner, according to the fifth embodiment of the present invention, the behavioral information of another vehicle is needed for performing behavior determination based on the behavioral information of own vehicle. Accordingly, the information necessary for the attacker to conduct impersonation is increased, so that it becomes difficult for the attacker to impersonate the vehicle, resulting in an increase in the inhibiting effect.

It is noted that the above embodiments may be freely combined with each other, or each of the above embodiments may be modified or simplified as appropriate within the scope of the present invention.

In the drawings, identical reference numerals denote identical or equivalent configurations.

Various modifications and alterations of this invention will be apparent to those skilled in the art without departing from the scope and spirit of this invention, and it should be understood that this is not limited to the illustrative embodiments set forth herein.

What is claimed is:

1. A wireless communication apparatus comprising:
a processor to execute a program; and
a memory to store the program which, when executed by the processor, causes the processor to perform operations comprising:
acquiring behavioral information of a vehicle while the vehicle is in a driving state, the behavioral information representing a behavior of the wireless communication apparatus while the wireless communication apparatus is mounted in this vehicle;
storing the behavioral information in a behavioral information storage;
based on receiving a message transmission request, determining whether the behavioral information stored in the behavioral information storage represents a vehicle behavior being currently acquired;
based on a result of the determining indicating that the behavioral information represents the vehicle behavior, controlling a transmitter of the wireless communication apparatus to perform a message transmission to another vehicle; and
based on the result of the determining indicating that the behavioral information, does not represent the vehicle behavior, controlling the transmitter to transmit to the another vehicle a stop transmission message indicating that the message transmission is not being performed and to transmit, to a communication manager, a message indicating that the vehicle is impersonated.

2. The wireless communication apparatus according to claim 1, wherein, when the behavioral information is not stored in the behavioral information storage, behavioral information is acquired from a pre-stop information storage in which a history of the behavioral information during driving is accumulated.

3. The wireless communication apparatus according to claim 1, wherein the operations further comprise:
acquiring behavioral information of the another vehicle, and
storing the behavioral information of the another vehicle in an another-vehicle behavioral information storage,
wherein, based on the result of the determining indicating that the behavioral information represents the vehicle behavior, the message transmission is stopped if another determination is made that the behavioral information of the another vehicle does not represent the vehicle behavior.

4. The wireless communication apparatus according to claim 3, wherein the operations further comprise:
based on a result of the another determination indicating that the behavioral information of the another vehicle does not represent the vehicle behavior, controlling the transmitter to transmit to the another vehicle the stop transmission message indicating that the message transmission is stopped.

5. The wireless communication apparatus according to claim 3, wherein the operations further comprise:
based on a result of the another determination indicating that the behavioral information of the another vehicle does not represent the vehicle behavior, controlling the transmitter to transmit, to the communication manager, a message indicating that the vehicle is impersonated.

6. A wireless communication apparatus comprising:
a processor to execute a program; and
a memory to store the program which, when executed by the processor, causes the processor to perform operations comprising:
acquiring behavioral information of a vehicle, the behavioral information representing a behavior of the wireless communication apparatus while the wireless communication apparatus is mounted in this vehicle;
storing the behavioral information of the vehicle in a behavioral information storage;
acquiring behavioral information of another vehicle;
storing the behavioral information of the another vehicle in an another-vehicle behavioral information storage;
based on receiving, a message transmission request, determining whether the behavioral information of the vehicle represents a vehicle behavior by comparing the behavioral information of the vehicle with the behavioral information of the another vehicle;
performing by a transmitter of the wireless communication apparatus, a message transmission to the another vehicle based on a result of the determining that the behavioral information of the vehicle represents the vehicle behavior and based on the message transmission request; and
based on the result of the determining indicating that the behavioral information of the vehicle does not represent the vehicle behavior, controlling the transmitter to transmit to the another vehicle a stop transmission message indicating that the message transmission is not being performed and to transmit, to a communication manager, a message indicating that the vehicle is impersonated.

7. A wireless communication method between a vehicle and another vehicle, the wireless communication method comprising:
acquiring, by the vehicle, behavioral information of the vehicle while the vehicle is in a driving state, the behavioral information representing a behavior of a wireless communication apparatus while the wireless communication apparatus is mounted in this vehicle;
storing the acquired behavioral information;
based on a message transmission request, determining whether the stored behavioral information represents a vehicle behavior being currently acquired;
based on the determining that the behavioral information represents the vehicle behavior, performing a message transmission to the another vehicle; and
based on the determining that the behavioral information does not represent the vehicle behavior, transmitting, to the another vehicle, a stop transmission message indicating that the message transmission is not being performed and transmitting, to a communication manager, a message indicating that the vehicle is impersonated.

8. The wireless communication method according to claim 7, wherein, based on the determining that the behavioral information represents the vehicle behavior, the message transmission is not performed if behavioral information of the another vehicle that is acquired from the another vehicle does not represent the vehicle behavior.

9. The wireless communication method according to claim 8, wherein, based on the determining that the behavioral information represents the vehicle behavior, the stop transmission message indicating that the message transmission is not being performed is transmitted to the another vehicle if the behavioral information of the another vehicle does not represent the vehicle behavior.

10. The wireless communication method according to claim 8, wherein, based on the determining that, the behavioral information represents the vehicle behavior, a message indicating that the vehicle is impersonated is transmitted to the communication manager if the behavioral information of the another vehicle does not represent the vehicle behavior.

11. A wireless communication method between a vehicle and another vehicle, the wireless communication method comprising:
    acquiring, by the vehicle, behavioral information of the vehicle, the behavioral information representing a behavior of a wireless communication apparatus while the wireless communication apparatus is mounted in this vehicle;
    storing the acquired behavioral information of the vehicle;
    acquiring behavioral information of the another vehicle from the another vehicle;
    storing the acquired behavioral information of the another vehicle;
    based on receiving a message transmission request, determining whether the behavioral information of the vehicle represents a vehicle behavior by comparing the behavioral information of the vehicle with the behavioral information of the another vehicle; and
    based on the determining that the behavioral information of the vehicle does not represent the vehicle behavior, transmitting, to the another vehicle, a stop transmission message indicating that a message transmission is not being performed and transmitting, to a communication manager, a message indicating that the vehicle is impersonated.

12. The wireless communication apparatus according to claim 1, wherein the operations further comprise:
    prior to the determining whether the behavioral information stored in the behavioral information storage represents the vehicle behavior, accepting the message transmission request that requests to perform a vehicle-to-vehicle communication, the message transmission request comprising content of a message to be transmitted.

* * * * *